Figure 1:
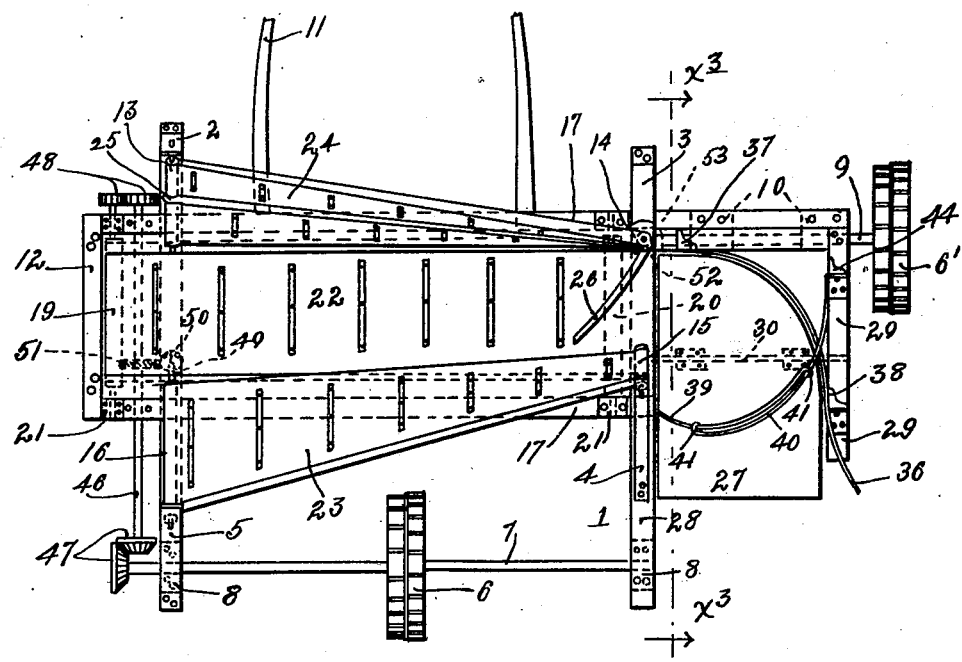

No. 677,621.  
C. N. BARGQUIST.  
BUNDLE CARRYING ATTACHMENT FOR HARVESTERS.  
(Application filed Dec. 4, 1900.)

Patented July 2, 1901.

(No Model.)

3 Sheets—Sheet 1.

Witnesses  
Harry Kilgore  
Elizabeth Kilner

Inventor,  
Carl N. Bargquist  
By his Attorneys.  
Williamson Merchant

No. 677,621. Patented July 2, 1901.
C. N. BARGQUIST.
BUNDLE CARRYING ATTACHMENT FOR HARVESTERS.
(Application filed Dec. 4, 1900.)

(No Model.) 3 Sheets—Sheet 2.

Fig. 2.

Witnesses
C. H. Turner.
M. M. McIvoy

Inventor
Carl N. Bargquist.
By his Attorneys.
Williamson Merchant

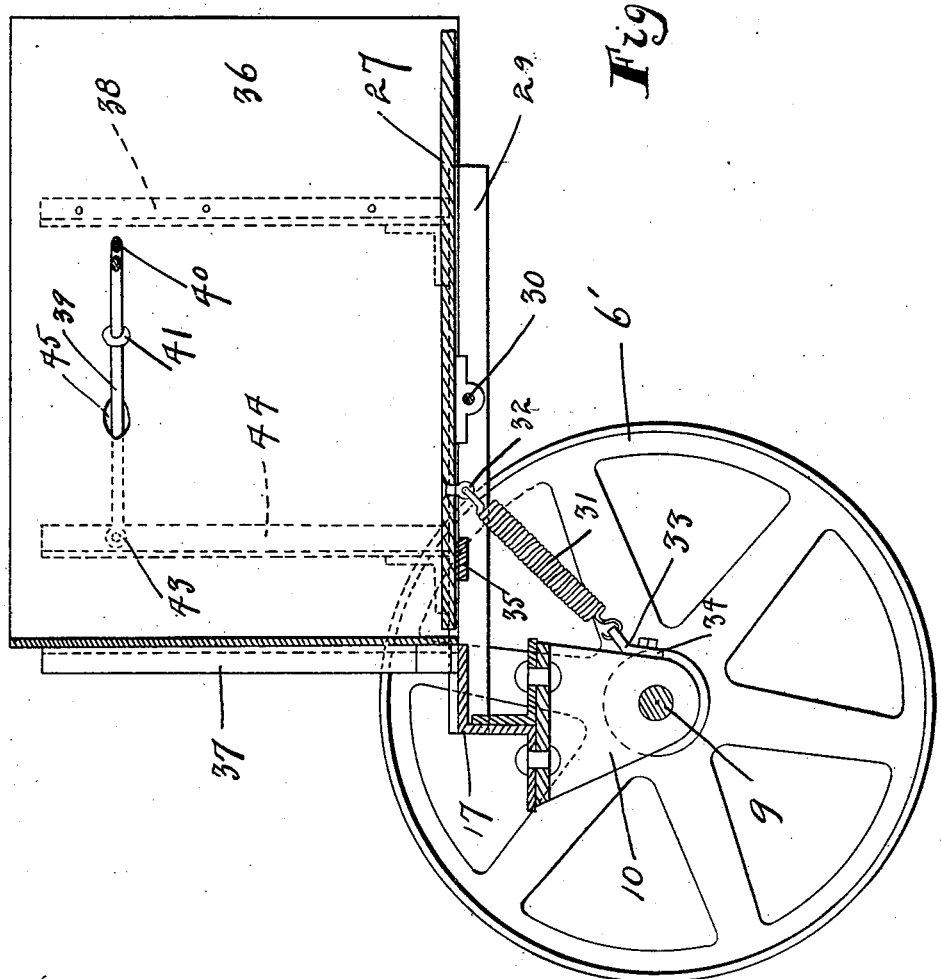

UNITED STATES PATENT OFFICE.

CARL N. BARGQUIST, OF PELICAN LAKE, MINNESOTA.

BUNDLE-CARRYING ATTACHMENT FOR HARVESTERS.

SPECIFICATION forming part of Letters Patent No. 677,621, dated July 2, 1901.

Application filed December 4, 1900. Serial No. 38,658. (No model.)

*To all whom it may concern:*

Be it known that I, CARL N. BARGQUIST, a citizen of the United States, residing at Pelican Lake, in the county of Ottertail and State of Minnesota, have invented certain new and useful Improvements in Bundle-Carrying Attachments for Harvesters; and I do hereby declare the following to be a full, clear, and exact description of the invention, such as will enable others skilled in the art to which it appertains to make and use the same.

My invention has for its object to provide an improved bundle-carrying device for use in connection with twine-binding harvesters; and to this end it consists of the novel devices and combinations of devices hereinafter described, and defined in the claims.

In accordance with my invention I employ a truck having one or more traction-wheels and provide the same with canvases or endless conveyers for receiving and arighting the bundles, with an expansible shock-holder, to which the bundles are delivered by said conveyer, and with a dumping-bottom below the said shock-holder arranged to be automatically tilted when the bundles have accumulated sufficiently and to thereby dump the accumulated bundles in a loose shock or pile upon the ground. The truck of this bundle-carrier is preferably drawn by a single horse, and the inner end of the truck-frame is preferably, although not necessarily, attached to the adjacent portion of the harvester-frame by yielding joints or connections.

I will now describe specifically the preferred form of my improved bundle-carrying device or attachment.

In the drawings which illustrate the said invention like characters indicate like parts throughout the several views.

Figure 1 is a plan view showing the complete bundle-carrier. Fig. 2 is a side elevation of the same looking from that side which abuts against the harvester, some parts of the said device, such as the canvases, being removed; and Fig. 3 is a vertical section on the line $x^3$ $x^3$ of Fig. 1.

The numeral 1 indicates the platform-frame of the truck, the same having upright brackets 2, 3, 4, and 5. As shown, the truck has two traction-wheels 6 and 6'. The traction-wheel 6 is located at the rear of the frame 1, and its shaft 7 is journaled in boxes 8 on rearwardly-projected portions of the said frame 1. The traction-wheel 6' is located at the front and right-hand side of the frame 1, and its shaft 9 is journaled in bearings 10, secured on the under side of the said frame.

As shown, the truck is adapted to be drawn by a horse hitched to the shafts 11, and a frame-bar 12, secured at the left-hand side of the truck-frame, is adapted to be secured, preferably by flexible joints afforded by any suitable devices, (not shown,) to the adjacent portion of the harvester-frame.

Canvas-rollers 13, 14, 15, and 16 are mounted at their upper ends in the standards 2, 3, 4, and 5, respectively, while at their lower ends they are suitably mounted in longitudinally-extended beams 17 of the platform-frame 1, which beams are, as shown, formed of Z-iron having suitable bearing-blocks 18. A pair of horizontally-disposed canvas-rollers 19 20 are mounted in suitable bearings 21, secured on the beams 17. A platform-canvas 22 runs over the rollers 19 and 20. An arighting-canvas 23 runs over the rollers 15 and 16, and a pair of slightly-separable butting-canvases 24 run over the rollers 13 and 14. The roller 13 has a collar 25, which spaces apart the canvases 24, and the roller 14 has a packer or packing-arm 26, which works through the space left between the said canvases 24.

It will be noted that the rollers 13 and 16, (see particularly Fig. 2,) which stand adjacent to the harvester, are very considerably inclined, while the outer rollers 14 and 15 are vertical or approximately vertical. This causes the canvases 23 and 24 to diverge upward in the vicinity of the harvester and to gradually approach parallelism as they extend toward the said outer rollers. Outward and to the right of the rollers 14 and 15 and in a horizontal plane approximately on a level with the top of the platform-canvas 22 is a dumping-platform 27, which is pivoted between bars 28 and 29 on a pivot-shaft 30. A spring 31, attached to an eye 32, depending from the platform 27, and to an eye 33 on a depending bracket 34 of the frame 1, normally holds the said platform in a horizontal position, with its forward end against a stop-bar 35, which bar 35 is, as shown, supported at its ends by the beams 28 and 29 of the platform. The numeral 36 indicates a concave side-board or grain-guide disposed in a vertical position above the tilting platform 27, its inner end being secured, as shown, to a post 37 in the vicinity of the roller 14 and its rear portion being secured to another post, 38, which rises from the platform-beam 29. By reference to Fig. 1 it will be noted that the forward and outer portion of the tilting platform 27 is cut on a curved line that extends just inward and rearward of the guide-board 36, so that the said platform is left free to tilt on its pivot 30.

The gap left between the rear portion of the guide-board 36 and the outer and rear canvas-roller 15 is spanned by an expansible or yielding shock-holder, shown as afforded by a pair of curved spring-rods 39 and 40, provided with eyes 41 at their ends, which freely slide, the one on the body of the connected rod. The inner end of the rod 39 is suitably connected, as shown at 42, (see Fig. 2,) to the supporting-bracket or upright 4, and the outer and forward end of the rod 40 is connected, as shown at 43, (see Fig. 3), to a post 44, projected upward from the platform-beam 29. It will also be noted by reference to Fig. 3 that the rod 40 works through a slot 45 in the guide-plate 36. The driving connections between the traction-wheels and the several endless canvases will now be traced.

The numeral 46 indicates a counter-shaft extended from front to rear of the machine, just outward of the platform-roller 19 and mounted in suitable bearings on the platform-frame. This shaft 46 is connected at its rear end with the shaft 7 of the traction-wheel 6 by a pair of bevel-gears 47, secured one on each of said shafts. At its forward end the shaft 46 is connected with a shaft of the platform-roller 19 by a pair of spur-gears 48, located one on each of said shafts. The shaft of the roller 16 is extended downward, as indicated at 49, and is provided with a skew-gear 50, which meshes with another skew-gear 51 on the intermediate portion of the shaft 46. By the above connections the platform canvas or apron 22 and the arighting canvas or apron 23 will be driven from the traction-wheel 6 under the forward movement of the machine. To drive the butting canvases or aprons 24, the shaft of the roller 14 is provided at its lower end with a bevel-pinion 52, which meshes with a bevel-wheel 53 on the inner end of the shaft 9 of the traction-wheel 6'.

Operation: The operation will be substantially as follows: The bound bundles from the harvester will of course be discharged extending horizontally and will fall flatwise onto the canvases or aprons which receive them. This bundle-carrying attachment should be so connected to the harvester-frame that the discharged bundles will fall onto the platform-canvas 22 with the heads of the grain projecting onto the arighting canvas or apron 23 and with the butt-ends of the grain presented to the so-called "butting" canvases or aprons 24. Under the action of these three canvases or aprons the bundle will be gradually arighted or up-ended and will be stood upon its butt-end upon the platform-canvas 22 at approximately the time that it reaches the outer portion of said canvas, at which time it is engaged by the packing-arm 26. By the packing-arm 26 the bundle is forced onto the forward portion of the tilting platform 27 and against the guide-board 36. The bundles are thus deposited onto the platform 27 one after another and by the packing-arm 26 are gradually forced backward on the said platform as they accumulate, the yielding shock-holder afforded by the spring-rods 39 40 serving to permit this accumulation. When, however, the shocks have accumulated sufficiently on the rearward portion of said platform 27, the spring 31 will be overcome and the platform will tip and dump the entire load of bundles onto the ground in a loose shock or pile.

This machine is of course capable of many modifications within the scope of my invention. The terms "canvases" and "aprons" as applied to the endless carriers are herein used synonomously and in a generic sense to cover all forms of endless conveyers suitable for the above purposes.

What I claim, and desire to secure by Letters Patent of the United States, is as follows:

1. A bundle-receiving device comprising an endless platform-apron, an arighting-apron gradually extending from an inclined toward a vertical position from its receiving toward its delivery end, and a tilting platform receiving from said aprons.

2. A bundle-receiving device comprising a platform-apron or endless carrier, and endless arighting and butting aprons coöperating therewith, which latter aprons gradually extend from inclined toward vertical positions from their receiving toward their delivery ends, a tilting platform receiving from said aprons, and a yielding or expansible shock-holder permitting the accumulation of bundles on the said tilting platform.

3. A bundle-carrying device, comprising the tilting platform 27 pivoted at 30, the guide-board 36 following the forward and outer portion of said platform, the overlapping spring-rods 39, 40, affording a shock-holder and means for delivering the bundles grain end upward onto the said platform, substantially as described.

4. A bundle-carrying device comprising an endless platform apron or canvas 22, the arighting-canvas 23 inclined at its receiving portion and more closely approaching a vertical at its delivery portion, whereby the bundles are gradually arighted, and a dumping device receiving an accumulation of bundles from the said aprons and automatically dumping the same, substantially as described.

5. In a bundle-carrying device, the combination with a truck having traction-wheels, of the endless canvases or conveyers 22, 23 and 24, driven from said traction-wheels, which canvases 23 and 24 are inclined at their receiving portions and gradually approach the vertical toward their delivery portions, the revolving packer 26 working at the delivery portions of said aprons, the spring-held dumping-platform 27 receiving from the said aprons, the guide-board 36 following the forward and outer portions of said dumping-platform, and the overlapping spring-rods 39, 40 affording a yielding shock-holder substantially as described.

In testimony whereof I affix my signature in presence of two witnesses.

CARL N. BARGQUIST.

Witnesses:
H. A. HELGESON,
A. M. HAPTAK.